United States Patent
Wang et al.

(10) Patent No.: US 6,561,462 B1
(45) Date of Patent: May 13, 2003

(54) SPACECRAFT POWER/SUN AQUISTION ALGORITHM USING SLIT SUN SENSORS

(75) Inventors: Hanching G. Wang, Hacienda Heights, CA (US); Umesh Ketkar, Torrance, CA (US); Albert A. Munoz, Redondo Beach, CA (US); Sadek Mansour, Redondo Beach, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/081,468

(22) Filed: Feb. 21, 2002

(51) Int. Cl.$^7$ ................................................. B64G 1/36
(52) U.S. Cl. .................. 244/171; 244/158 R; 244/164; 244/173; 250/203.1; 250/203.3; 250/203.4
(58) Field of Search ............................ 250/203.1, 203.3, 250/203.4, 201.1; 244/3.1, 3.24, 3.25–3.3, 158 R, 159, 160–171

(56) References Cited

U.S. PATENT DOCUMENTS

| | | | |
|---|---|---|---|
| 4,358,076 A | * 11/1982 | Lange et al. | 244/164 |
| 5,132,910 A | * 7/1992 | Scheit et al. | 244/164 |
| 5,255,879 A | 10/1993 | Yocum et al. | |
| 5,458,300 A | * 10/1995 | Flament et al. | 244/169 |
| 5,788,188 A | * 8/1998 | Damilano | 244/164 |
| 5,794,891 A | * 8/1998 | Polle et al. | 244/164 |
| 5,906,338 A | * 5/1999 | Surauer et al. | 244/165 |
| 6,019,320 A | * 2/2000 | Shah et al. | 244/164 |

* cited by examiner

Primary Examiner—Bernarr E. Gregory
(74) Attorney, Agent, or Firm—DiPinto & Shimokaji, PC (57) ABSTRACT

A spacecraft power/sun acquisition method includes a pitch search phase in which the spacecraft is rotated about a pitch axis, stopped, quaternions reset to remember position, and yaw search phase is entered when a first TOA occurs from a first slit sun sensor, and a keyhole slew is performed when the first TOA does not occur. The method also includes yaw search phase in which a keyhole slew is performed by rotating the spacecraft about a yaw axis, stopping the spacecraft, and entering pitch search phase when the first TOA does not occur, and in which the spacecraft is rotated about a yaw axis, stopped, quaternions reset, and sun hold phase is entered when a second TOA occurs from a second slit sun sensor. Lastly, the method includes a sun hold phase in which the spacecraft is oriented to the sun and placed in spin at power safe attitude.

40 Claims, 5 Drawing Sheets

| SLEW DIRECTION SELECTION LOGIC | | | |
|---|---|---|---|
| SLEW DIRECTION LOGIC INPUTS | | SLEW DIRECTION LOGIC OUTPUTS | |
| PITCH SLEW DIRECTION | ACSS TOA | YAW SEARCH DIRECTION | STEER-TO-NULL SLEW DIRECTION |
| +y | ψ3 ONLY | −z | −y |
| +y | ψ4 ONLY | +z | −y |
| +y | ψ3 & ψ4 (IN OVERLAP REGION) | −z FOR 30 DEG (OVERLAP IS ABOUT 15 DEG), IF ψ1 DOES NOT LIT, THEN +z | −y |
| −y | ψ3 | −z | +y |
| −y | ψ4 | +z | +y |
| −y | ψ3 & ψ4 (IN OVERLAP REGION) | −z FOR 30 DEG, IF ψ1 DOES NOT LIT, THEN +z | +y |

US 6,561,462 B1

SPACECRAFT POWER/SUN AQUISTION ALGORITHM USING SLIT SUN SENSORS

BACKGROUND OF THE INVENTION

The present invention generally relates to sun acquisition and power acquisition for spacecraft and, more particularly, to methods for sun and power acquisition in spacecraft using slit sun sensors.

Prior art spacecraft typically acquire the sun for power safety by wide field of view (WFOV) sun sensor or narrow field of view (NFOV) slit sun sensor. The use of a wide field of view sun sensor for sun acquisition requires a clear diamond field of view (FOV) about 120×120 degrees wide. As the size of certain components on the spacecraft, such as the radiator and the solar wing with concentrator, is increased, it has become difficult for spacecraft to find such large clear FOV. In addition, the use of a wide field of view sun sensor for sun acquisition can involve angular measurement processing requiring expensive electronic hardware, such as buffer channel hardware and hardware for angular measurement processing. A prior art method of sun acquisition is disclosed in U.S. Pat. No. 5,255,879, issued Oct. 26, 1993, entitled "Three Axes Stabilized Spacecraft and Method of Sun Acquisition", and assigned to the assignee of the present invention.

Figure 1:
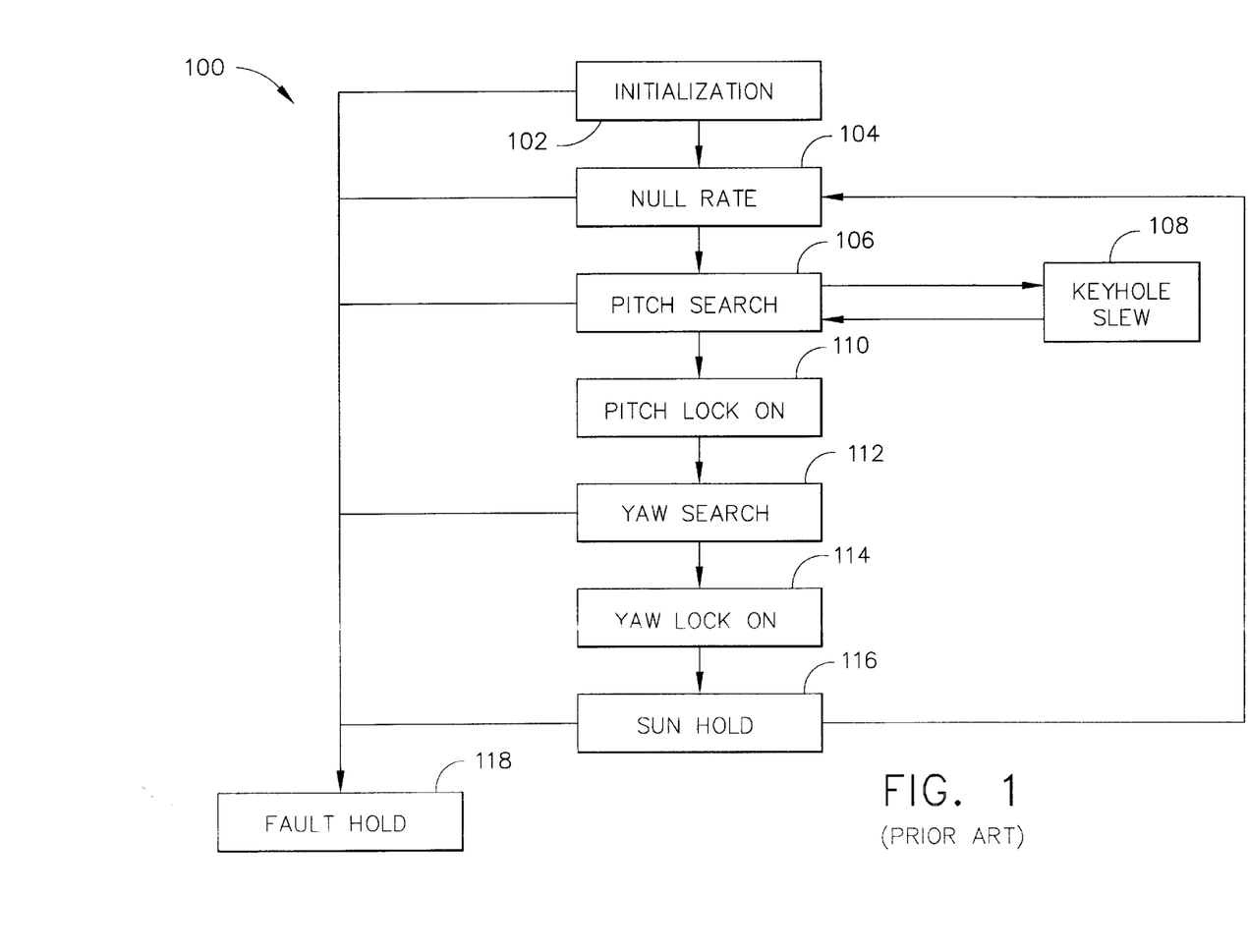
FIG. 1 is a phase transition block diagram of a previously used sun acquisition method for spacecraft using NFOV slit sun sensors.

FIG. 1 shows a phase transition block diagram of a previously used sun acquisition method using slit sun sensors. Method 100, shown in FIG. 1, uses the slit sun sensor proportional angular measurements similar to a NFOV sun sensor. Method 100 includes an initialization phase 102, null rate phase 104, pitch search phase 106, keyhole slew phase 108, pitch lock-on phase 110, yaw search phase 112, yaw lock-on phase 114, sun hold phase 116, and fault hold phase 118. The arrows shown in FIG. 1 indicate the control logic, or flow of control, between phases of method 100. For example, from initialization phase 102 control may pass either to null rate phase 104 under a "normal" state of affairs, or to fault hold phase 118 under abnormal conditions, such as method 100 "timing out" before sun acquisition has been achieved. As seen in FIG. 1, pitch search phase 106 is followed by pitch lock-on phase 110 and yaw search phase 112 is followed by yaw lock-on phase 114. Also, as seen in FIG. 1., pitch search phase 106 is repeated, if need be, only after the flow of control passes through pitch lock-on phase 110, yaw search phase 112, yaw lock-on phase 114, sun hold phase 116, and null rate phase 104. Thus, method 100 represents a complicated process for sun acquisition, which is not very robust, i.e., prone to failure, or entering the fault hold phase 118 state, under many conditions.

As can be seen, there is a need for a simpler, more robust method for sun acquisition for reaching power safety in spacecraft. There is also a need for a spacecraft sun acquisition/power safety method that avoids the use of expensive hardware used by WFOV sun sensor acquisition and is less complicated than previous NFOV sun acquisition.

SUMMARY OF THE INVENTION

The present invention provides a simpler, more robust method for sun acquisition for reaching power safety in spacecraft. The spacecraft sun acquisition/power safety method of the present invention avoids the use of expensive hardware used by WFOV sun sensor acquisition and is less complicated than previous NFOV sun acquisition.

In one aspect of the present invention, a[n algorithm] method for a spacecraft includes a yaw search phase in which the spacecraft is rotated about a yaw axis, the spacecraft is stopped, quaternions are reset to remember position, and a sun hold phase is entered when a second TOA occurs from a second slit sun sensor. The method includes a pitch search phase in which the spacecraft is rotated about a pitch axis, the spacecraft is stopped, quaternions are reset to remember position, and the yaw search phase is entered when a first TOA occurs from a first slit sun sensor, and the method includes a sun hold phase in which the spacecraft is oriented to the sun and placed in spin.

In another aspect of the present invention, a method for spacecraft sun acquisition includes steps of: performing an initialization phase, in which a spacecraft is placed in a known state suitable for sun acquisition; performing a yaw search phase, in which the spacecraft is rotated about a yaw axis, the spacecraft is stopped, quaternions are reset to remember position, and the sun hold phase is entered when a second TOA occurs from a second slit sun sensor; performing a pitch search phase, in which the spacecraft is rotated about a pitch axis, the spacecraft is stopped, quaternions are reset to remember position, and the yaw search phase is entered when a first TOA occurs from a first slit sun sensor; and performing a sun hold phase in which the spacecraft is oriented to the sun and placed in spin.

In still another aspect of the present invention, a[n algorithm] method for a spacecraft includes a sun hold phase in which the spacecraft is oriented to the sun and placed in spin; a yaw search phase; a pitch search phase where the pitch search phase is initially entered before the yaw search phase is initially entered; a null rate phase in which a motion of the spacecraft is stopped and the pitch search phase is entered; and an initialization phase in which the spacecraft is placed in a known state suitable for sun acquisition and the null rate phase is entered, and where the method begins in the initialization phase. In the pitch search phase, the spacecraft is rotated about a pitch axis, the spacecraft is stopped, quaternions are reset to remember position, and the yaw search phase is entered when the first TOA occurs from a first slit sun sensor, and the spacecraft is rotated about a pitch axis and a keyhole slew is performed when the first TOA does not occur from the first slit sun sensor after a complete revolution. In the yaw search phase, the spacecraft is rotated about a yaw axis, the spacecraft is stopped, quaternions are reset to remember position, and the sun hold phase is entered when a second TOA occurs from a second slit sun sensor.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides a simpler, more robust method for sun acquisition for reaching power safety in spacecraft. The spacecraft sun acquisition/power safety method of one embodiment of the present invention avoids the use of expensive hardware used by wide field of view (WFOV) sun sensor acquisition and is less complicated than previous narrow field of view (NFOV) sun acquisition. The method of one embodiment uses software time of arrival (TOA) signals of slit sun sensors to reach power safety. A number of example embodiments are disclosed to illustrate useful variations of the power/sun acquisition method of the present invention.

Using TOA signals provides a simpler and more robust way for sun acquisition compared to the prior art. For example, the TOA can be the arm-trigger type hardware TOA, or the software TOA by zero-crossing detection of differential angular signal, peak detection of individual slit signal, or maximum derivative detection of differential angular signal. The zero-crossing is the easiest in implementation and is used to illustrate the method of one example embodiment.

The inventive method only uses TOA such that the slit sensor angular measurement processing can be eliminated and electronic hardware addition is not needed. The method also eliminates the pitch lock-on phase 110, keyhole slew phase 108, and yaw lock-on phase 114 of the previously used sun acquisition procedure illustrated in FIG. 1. The inventive method, using less hardware and software processing, is therefore simpler and more robust than its predecessors.

Figure 2:
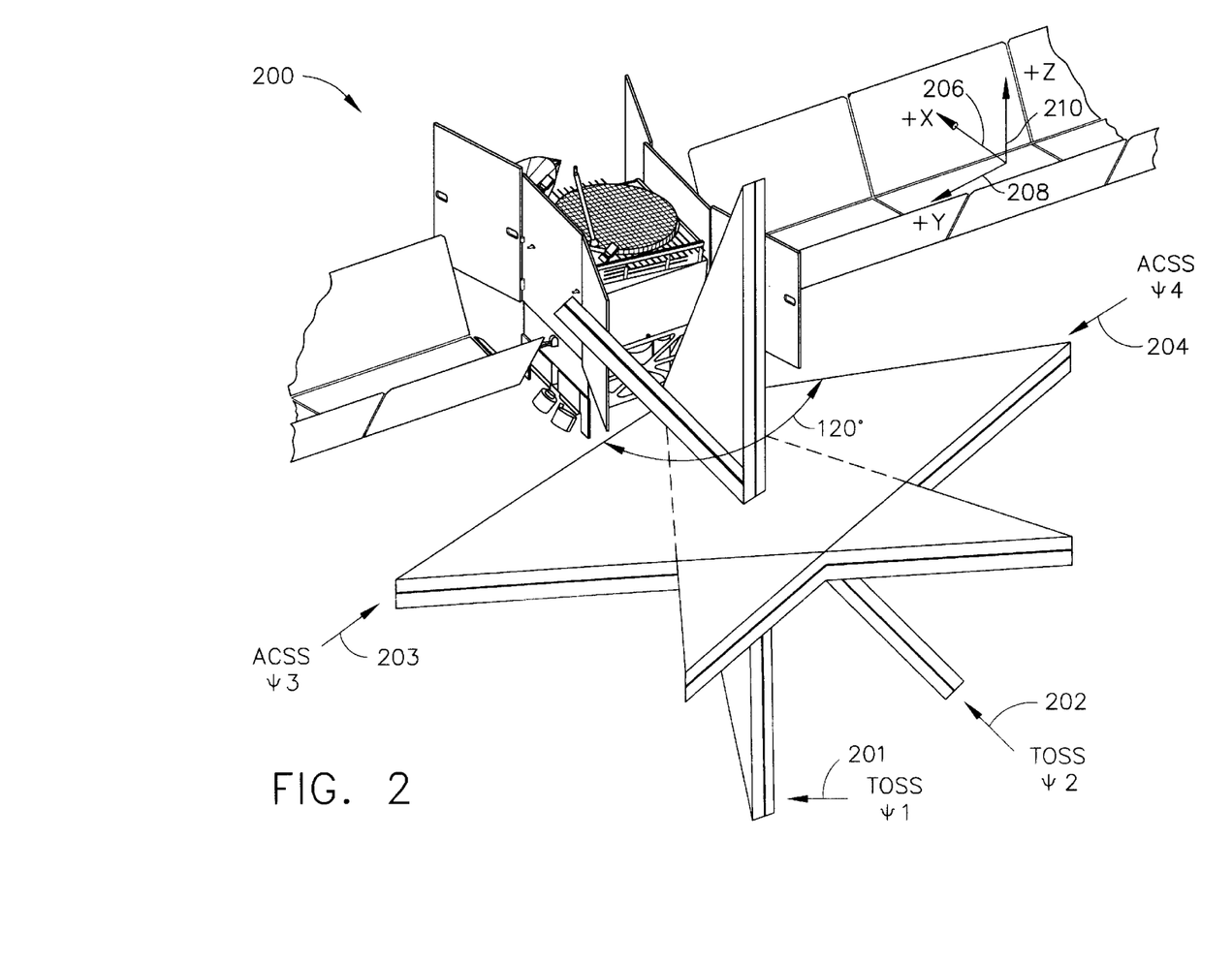
FIG. 2 is a perspective view of a spacecraft using slit sun sensors for sun acquisition, according to an embodiment of the present invention.

Referring now to FIG. 2, spacecraft 200, using slit sun sensors for sun acquisition, is illustrated according to an embodiment of the present invention. Spacecraft 200 may be equipped with transfer orbit slit sun sensors (TOSS) Ψ1 201 and Ψ2 202, shown in FIG. 2, for attitude determination in bi-propellant transfer orbit. With the addition of acquisition slit sun sensors (ACSS) Ψ3 203 and Ψ4 204, shown in FIG. 2, a yaw search in addition to a pitch search will cover the 4π sky search for sun acquisition using ACSS and TOSS. FIG. 2 also shows a 3-dimensional x-y-z reference frame, also referred to as "body" reference frame, comprising three mutually perpendicular axes, x axis 206, y axis 208, and z axis 210. Rotation of spacecraft 200 about x axis 206 may be referred to as "roll", "spin", or "x-spin". Rotation of spacecraft 200 about y axis 208 may be referred to as "pitch", and y axis 208 may be referred to as the "pitch axis". Rotation of spacecraft 200 about z axis 210 may be referred to as "yaw" or "z-spin", and z axis 210 may be referred to as the "yaw axis". The plane containing x axis 206 and y axis 208 is referred to as the "x/y plane"; the plane containing y axis 208 and z axis 210 is referred to as the "y/z plane"; and, the plane containing x axis 206 and z axis 210 is referred to as the "x/z plane". The expression "−x axis" refers to the axis collinear with x axis 206 and having a direction opposite to that, shown in FIG. 2, of x-axis 206. An axis about which spacecraft 200 is rotating, or spinning, may be referred to as the "spin axis"; for example, if spacecraft 200 is undergoing x-spin, then x axis 206 may be referred to as the spin axis. "Polar angle" refers to an angle, in any plane containing the spin axis and the sun line, measured with respect to the spin axis. The sun line is the direction vector from the spacecraft center to the sun. As depicted in FIG. 2, Ψ3 203 and Ψ4 204, spanning 120 degrees in the x/y plane, and Ψ1 201, spanning 90 degrees in the x/z plane, jointly form a mechanical bore sight at the −x axis.

A brief synopsis of the inventive method is as follows. The method may start with a pitch search and looks for Ψ3 and Ψ4 TOA signals to indicate that the sun is in the body x/y plane. Once the TOA occurred, the method resets quaternions and then uses gyro to slew the spacecraft in yaw axis and looks for TOA to indicate that the sun is in body x/z plane and near the −x axis (bore sight of slit sun sensors). Once this TOA occurred, the method "knows" the sun orientation in body and proceeds to sun hold which comprises a 90 deg yaw slew and subsequent x-spin.

Figure 3:
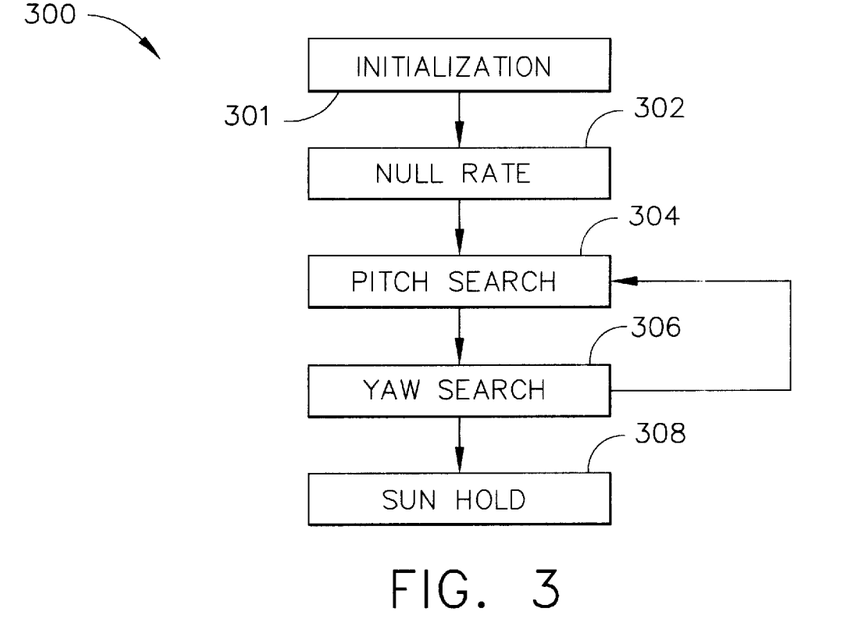
FIG. 3 is a phase transition block diagram of a method according to an embodiment of the present invention, for sun acquisition using NFOV slit sun sensors.

Referring now to FIG. 3, a phase transition block diagram is used to illustrate method 300 according to one embodiment. Method 300 may be used, for example, for sun acquisition using NFOV slit sun sensors for TOA on a spacecraft using thrusters for attitude and momentum adjustment. The initial state of the spacecraft prior to execution of method 300, for example, is that the spacecraft may be in arbitrary attitude and momentum states under wing-stowed configuration in bi-propellant transfer orbit. The final state of the spacecraft after execution of method 300, for example, is that the spacecraft may be in x-spin with sun polar angle near 90 degrees. For purposes of illustration of method 300 reference is made to spacecraft 200, shown in FIG. 2.

Method 300 includes initialization phase 301, null rate phase 302, pitch search phase 304, yaw search phase 306, and sun hold phase 308. The arrows shown in FIG. 3 indicate the control logic, or flow of control, between phases of method 300.

Method 300 may begin at initialization phase 301. Method 300 may process initialization phase 301 as follows. Place the spacecraft control processor (SCP) at known states suitable for thruster sun acquisition. Control then passes to null rate phase 302.

Method 300 may process null rate phase 302 as follows. Stop motion of spacecraft 200. Control then passes to pitch search phase 304.

Method 300 may process pitch search phase 304 as follows. Rotate spacecraft 200 along pitch axis, i.e., y axis 208, with the intention to bring sun to the x/y plane as will be detected by TOA signal from Ψ3 203 or Ψ4 204. Ψ3 203 and Ψ4 204 span a combined 120 degrees on the x/y plane. If TOA occurs, reset both commanded and estimated quaternions to remember this position then proceed to yaw search phase 306. If TOA does not occur, perform a keyhole slew, i.e. rotation along yaw axis for 90 degrees, then come back to pitch search again.

Method 300 may process yaw search phase 306 as follows. Rotate spacecraft 200 along yaw axis, i.e., z axis 210, to bring the sun to the x/z plane closer to the −x axis. If TOA did not occur in pitch search phase 304, go back to pitch search phase 304 again. Since there is no absolute position reference during this course, only the inertial reference unit (IRU) as a relative attitude sensor is used. The error in this short period IRU propagation is acceptably small. When TOA from Ψ1 201 occurs, reset quaternions again and proceed to sun hold phase 308.

Method 300 may process sun hold phase 308 as follows. The sun is now close to the −x axis, with close to zero panel current. Spacecraft 200 may then start z-spin to render power safety. Spacecraft 200 may also rotate along z axis 210 for 90 degrees to bring the sun to the +y axis 208, with panel current near maximum, check panel current is over safety threshold, then start the x-spin for power and thermal safety. The sun is held at polar angle to spin axis, i.e., x axis 206, near 90 degrees. Spacecraft 200 can also be transitioned to x-spin gyro wheel active nutation control (GWANC control) or no control (x-spin is passively stable). Spacecraft 200 may check the panel current periodically to determine if the power level is safe and if another run of the phase transition logic is needed. Pitch search phase 304 may be entered again when the received panel current is low.

Figure 4:
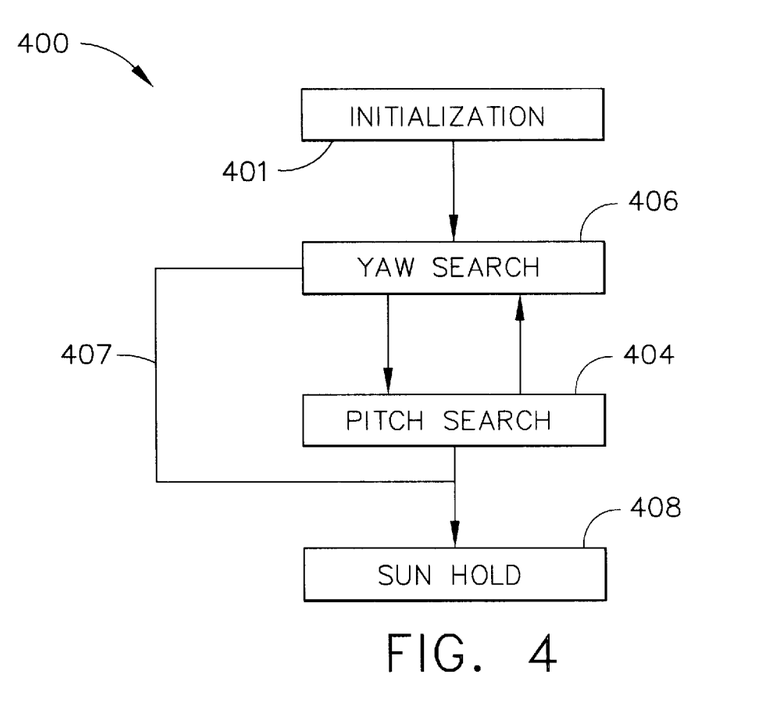
FIG. 4 is a phase transition block diagram of a method according to an embodiment of the present invention, for sun acquisition using NFOV slit sun sensors.

Referring now to FIG. 4, a phase transition block diagram is used to illustrate method 400 according to one embodiment. Method 400 may be used, for example, for sun acquisition using NFOV slit sun sensors for TOA on a spacecraft using thrusters for attitude and momentum adjustment. The initial state of the spacecraft prior to execution of method 400, for example, is that the spacecraft may be in z-spin wing-stowed bi-propellant transfer orbit. There may be an anomaly, and thruster sun acquisition may be part of the response to the anomaly. The final state of the spacecraft after execution of method 400, for example, is that the spacecraft may be in x-spin or z-spin with sun polar angle near 90 degrees. For purposes of illustration of method 400 reference is made to spacecraft 200, shown in FIG. 2.

Because the hardware TOA is unidirectional, the rotation in method 400 may be constrained to one direction only. Note that the direction flexibility is useless in thruster sun acquisition (but is useful in wheel sun acquisition for maximizing the use of wheel momentum capacity). Method 400, as compared to method 300, does not have a null rate phase; also, method 400 starts yaw search before pitch search. Again, a null rate phase is useless for thruster sun acquisition (but is useful in wheel sun acquisition for accurately measuring the total momentum). Through the course of bi-propellant transfer orbit, spacecraft 200 may be in z-spin with sun polar angle usually around 70–110 degrees. Most anomalies will not disturb the sun polar angle outside the range of 45–135 degrees (the range of Ψ1 201), and a simple yaw search (rotation of spacecraft 200 about z axis 210) will place the sun in the x/z plane—noting that z axis 210 is the minimum inertia axis. Method 400 simplifies the sensor processing and reduces the potential thermal concern of prolonged non-spinning.

Method 400 includes initialization phase 401, yaw search phase 406, pitch search phase 404, and sun hold phase 408. The arrows shown in FIG. 4 indicate the control logic, or flow of control, between phases of method 400.

Method 400 may begin at initialization phase 401. Method 400 may process initialization phase 401 as follows. Place the SCP at known states suitable for thruster sun acquisition. Control then passes to yaw search phase 406.

Method 400 may process yaw search phase 406 as follows. Do not stop spacecraft 200 from z-spin, instead continue the spin at commanded desired spin rate. Look for TOA from Ψ1 201. If TOA occurs reset commanded and estimated quaternions, and proceed to sun hold phase 408, as shown by arrow 407 in FIG. 4. The sun is in the x/z plane and within 45 degrees to the x/y plane. Note that the notorious hardware TOA problem, wherein the "armed" occurred at the wrong spun direction and subsequently "triggered" by noise at wrong angular position, can not happen since the spacecraft continuously rotates in the right direction (+z spin). Proceed to pitch search phase 404 if the TOA does not occur after a complete revolution.

Method 400 may process pitch search phase 404 as follows. If after at least one revolution in z-spin, TOA from Ψ1 does not occur, the sun is at least 45 deg away from Ψ3 and Ψ4 (the x/y plane). Stop the z-spin, and immediately establish the y-spin at desired rate at the right direction. Look for hardware TOA of Ψ3 203 and Ψ4 204. When TOA occurs (TOA will occur unless in eclipse since the z-spin and y-spin cover the $4\pi$ sphere), reset quaternions (corresponding to sun in x/y plane). If the desired final state is z-spin, proceed directly to sun hold phase 408. If the desired final state is x-spin, reenter to yaw search phase 406. The notorious hardware TOA problem mentioned above will not happen since the sun is originally at least 45 deg away from Ψ3 and Ψ4 (the x/y plane).

Method 400 may process sun hold phase 408 as follows. If the desired final state is z-spin, the entering condition is such that the sun is already in the x/y plane. Just start the z-spin at desired rate and check if the peak panel current is over safety threshold. If the desired final state is wing-stowed x-spin, the entering condition is such that the sun is already in the x/z plane. The spacecraft will then rotate about z axis 210 for 90 degrees to bring sun to the y/z plane, start the x-spin at desired rate and check panel current is over safety threshold. The sun is held at polar angle to spin axis near 90 degrees. Spacecraft 200 can also be transitioned to z-spin GWANC control if the final state is in z-spin, or to x-spin GWANC control or no control (x-spin is passively stable) if the final state is in x-spin.

If the desired final state is wing-deployed x-spin, the entering condition is such that the sun is already in the −x axis. The spacecraft will then rotisserie along sun-line (−x axis) to maintain the sun near −x axis. The sun is held at −x fixed orientation in body frame, or the sun polar angle to spin axis is near 0 degrees.

In order to be able to use the thrusters in a timely manner for sun acquisition, it may be required that half the thruster system be used for liquid apogee motor (LAM) burn, and the other half for emergency sun acquisition, since a majority of failures in bi-propellant transfer orbit may be related to thruster failure. The net effect is a slightly degraded fuel efficiency during LAM burn.

Figure 5:
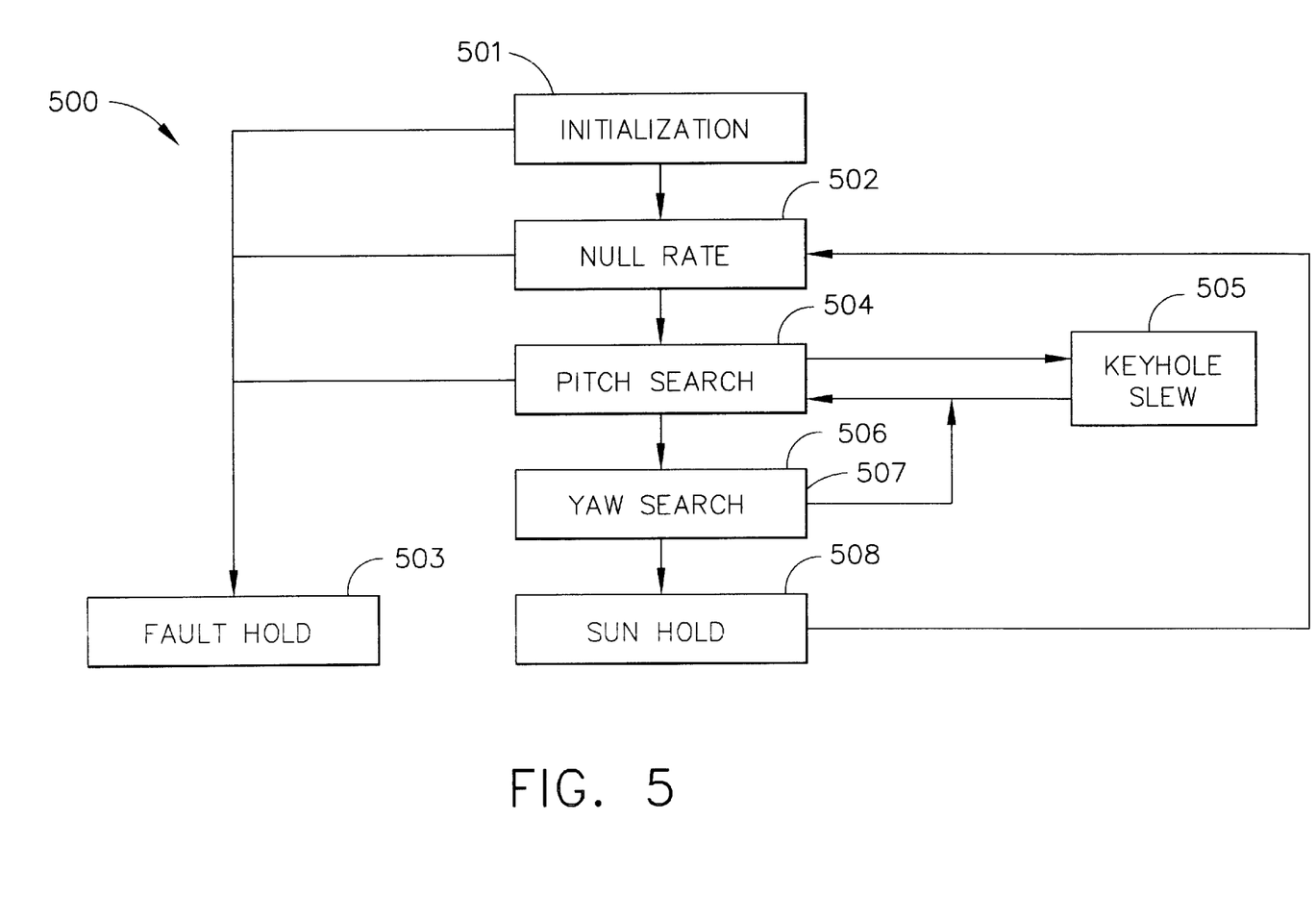
FIG. 5 is a phase transition block diagram of a method according to an embodiment of the present invention, for sun acquisition using NFOV slit sun sensors.

Referring now to FIG. 5, a phase transition block diagram is used to illustrate method 500 according to one embodiment. Method 300 and method 400 are more suitable for thruster sun acquisition in transfer orbit operation than for wheel sun acquisition. For wheel sun acquisition in on-station operation, discretion in rotation direction will help reduce the time-to-power-safe. Method 500 includes additional logic to ensure that the wheels are rotating in a smarter manner and is more suitable for wing-deployed wheel sun acquisition. Method 500 may be used, for example, for wheel sun acquisition in on-station operation by a spacecraft using NFOV slit sun sensors for TOA and yaw angle measurement. For purposes of illustration of method 500 reference is made to spacecraft 200, shown in FIG. 2.

Method 500 includes initialization phase 501, null rate phase 502, fault hold phase 503, pitch search phase 504, keyhole slew phase 505, yaw search phase 506, and sun hold phase 508. The arrows shown in FIG. 5 indicate the control logic, or flow of control, between phases of method 500.

Method 500 may begin at initialization phase 501. Method 500 may process initialization phase 501 as follows. Initialize spacecraft 200 to a known state suitable for sun acquisition. Control then passes either to null rate phase 502 or to fault hold phase 503. Fault hold phase 503 may be provided to handle abnormal conditions, such as a hardware or other failure on spacecraft 200 or "time out" condition being met.

Method 500 may process null rate phase 502 as follows. Null body rate to place momentum in wheels for better momentum estimation accuracy and check potential wheel saturation at this early stage. Control then passes to pitch search phase 504 or to fault hold phase 503.

Method 500 may process pitch search phase 504 as follows. Spacecraft 200 in rate control only with direction selected to avoid wheel saturation. If Ψ3 203 or Ψ4 204 TOA occurred, reset the estimated quaternion to identity, and set up the commanded quaternion for position control to intentionally overshoot by a selected angle, for example, 5 degrees. The 5 degrees overshoot is to detect the other TOA from Ψ3 203 or Ψ4 204 (misalignment between Ψ3 and Ψ4 is about 2 degrees), to reduce the stopping time and to ensure no directional ambiguity later in steer-to-null phase 507. Wait for the attitude to settle at the 5 degrees overshoot position then enter yaw search phase 506. If TOA has not occurred after one complete revolution, enter keyhole slew phase 505. Control may pass to fault hold phase 503 under appropriate conditions, as described above.

Method 500 may process keyhole slew phase 505 as follows. Yaw 90 degrees to position spacecraft 200 Ψ3 203 or Ψ4 204 to an orthogonal search with respect to the previous pitch search. Enter pitch search phase 504.

Figure 6:
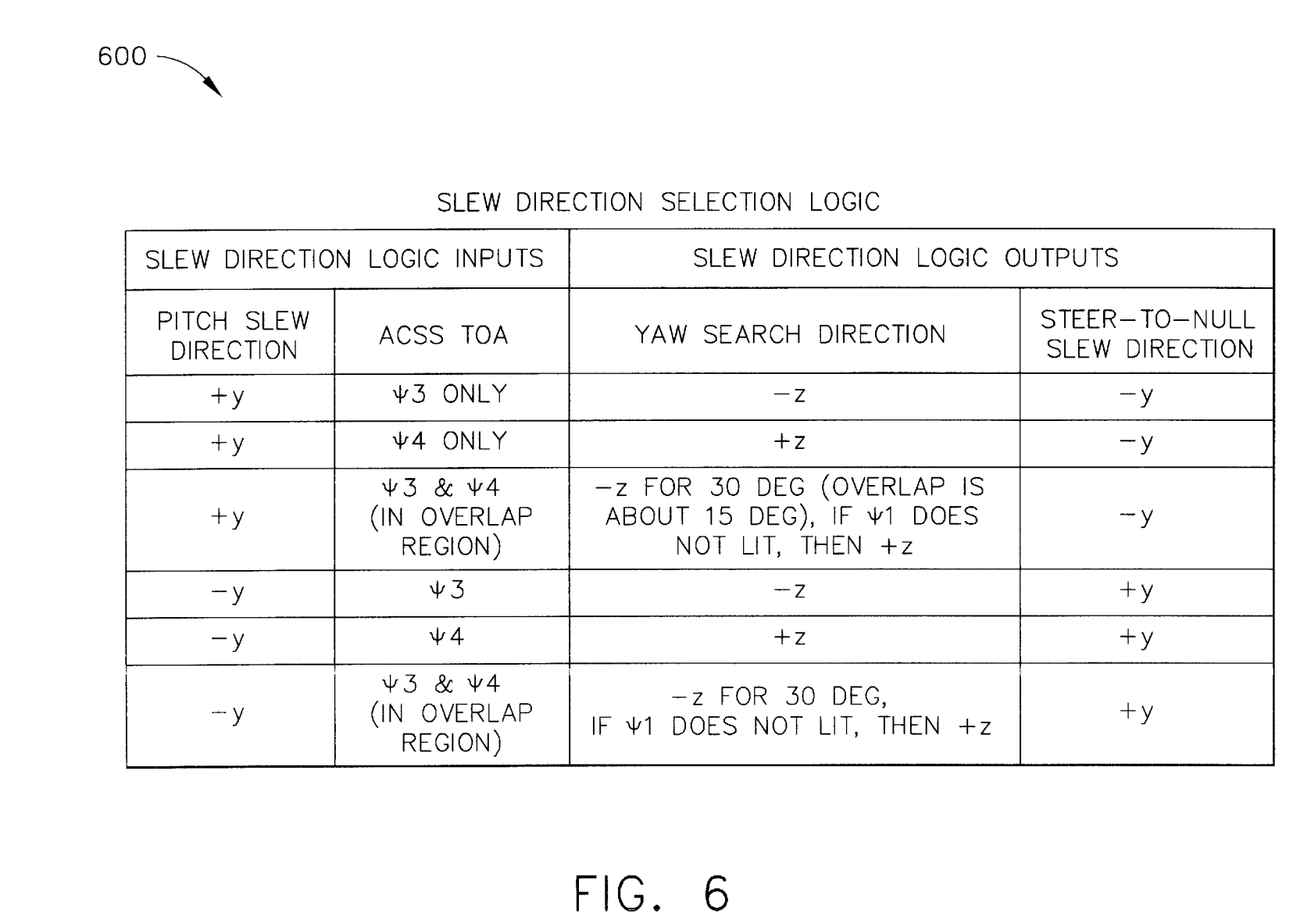
FIG. 6 is a table summarizing slew direction selection logic according to one embodiment of the present invention and, in particular, may be used in a method according to the embodiment associated with the phase transition block diagram shown in FIG. 5.

Method 500 may process yaw search phase 506 as follows. Spacecraft 200 is in rate control. Bring the sun to Ψ1 201 bore sight using yaw search direction as shown in table 600, seen in FIG. 6. If Ψ1 201 does not appear within threshold position and time, reverse the search direction. If Ψ1 201 does appear, wait for attitude to settle until sun is in Ψ1 201 bore sight.

Yaw search phase 506 may include steer-to-null phase 507, as indicated in FIG. 5. Method 500 may process steer-to-null phase 507 as follows. Bring the sun to TOSS/ACSS bore sight along the Ψ1 201 bore sight using Ψ1 201 angular measurement, spacecraft 200 in position control. The steering direction, i.e., "steer-to-null slew direction" shown in table 600, is opposite to previous pitch search direction as summarized in table 600, shown in FIG. 6. Reset the quaternion when the ACSS TOA, i.e., Ψ3 203 or Ψ4 204, occurred again. Wait for attitude to settle then enter sun hold phase 508.

Method 500 may process sun hold phase 508 as follows. Spacecraft 200 is in position control. If spacecraft 200 is in wing-stowed transfer orbit operation, a z-spin with sun polar angle near 90 degrees will start immediately for power and thermal safety. If spacecraft 200 is in wing-deployed on-station operation, spacecraft 200 will start an x-rotisserie at about 0.25 revolutions per hour for maintaining power/thermal/momentum safety. The estimator has accurate yaw angle measurement by Ψ1 201 (recall that Ψ3 203 and Ψ4 204 do not provide angular measurement, only TOA) and the controller will try to null this error in Ψ1 201. Due to the gyro bias of the uncalibrated IRU, spacecraft 200 may drift along the Ψ1 201 bore sight. This drifting will produce a limited coning angle (about 1.3 degrees) since spacecraft 200 is itself rotating. In steady state rotisserie, although Ψ1 201 is a single-axis yaw sensor, the kinematic coupling due to the rotisserie provides a mechanism for 2-axis attitude determination to maintain the sun close to the bore sight. Intuitively, the larger the coning, the larger the change in Ψ1 201 measurement. In other words, the pitch angular error is proportional to the rate of change of Ψ1 201 measurement. Because of slit sun sensor alignment matrix error in the programmable read only memory (PROM), the rotisserie rate command in body along the bore sight may not coincide with the actual sun line. However, due to the closed loop control with Ψ1 201 position update, spacecraft 200 will actually be coning around the true sun line in steady state.

It should be understood, of course, that the foregoing relates to preferred embodiments of the invention and that modifications may be made without departing from the spirit and scope of the invention as set forth in the following claims.

We claim:

1. A method of sun acquisition for a spacecraft having a time of arrival (TOA) sun sensor, comprising:
   a sun hold phase wherein the spacecraft is oriented to the sun and placed in spin;
   a yaw search phase wherein the spacecraft is rotated about a yaw axis; and
   a pitch search phase wherein the spacecraft is rotated about a pitch axis, the spacecraft is stopped, quaternions are reset to remember position, and said yaw search phase is entered when a first TOA occurs from a first slit sun sensor, and
   wherein, in said yaw search phase, the spacecraft is rotated about a yaw axis, the spacecraft is stopped, quaternions are reset to remember position, and said sun hold phase is entered when a second TOA occurs from a second slit sun sensor.

2. The method of claim 1 wherein said pitch search phase is initially entered before said yaw search phase is initially entered and wherein, in said pitch search phase, the spacecraft is rotated about a pitch axis and a keyhole slew is performed when said first TOA does not occur after a complete revolution.

3. The method of claim 1 wherein said yaw search phase is initially entered before said pitch search phase is initially entered, and
   wherein, in said yaw search phase, the spacecraft is rotated about a yaw axis and said pitch search phase is entered when said second TOA does not occur from said second slit sun sensor after a complete revolution.

4. The method of claim 1 wherein said yaw search phase is initially entered before said pitch search phase is initially entered, and
   wherein, in said pitch search phase, said yaw search phase is entered when said first TOA occurs from a first slit sun sensor and a desired final state is x-spin, and said sun hold phase is entered when said first TOA occurs from said first slit sun sensor and a desired final state is z-spin.

5. The method of claim 1, further comprising an initialization phase wherein the spacecraft is placed in a known state suitable for sun acquisition.

6. The method of claim 1, further comprising a null rate phase wherein a motion of the spacecraft is stopped and said pitch search phase is entered.

7. The method of claim 1 wherein said spin in said sun hold phase includes zero spin rate.

8. The method of claim 1, further comprising a keyhole slew phase wherein said keyhole slew phase is entered from said pitch search phase, the spacecraft is rotated 90 degrees about a yaw axis in said keyhole slew phase, and said pitch search phase is entered.

9. The method of claim 1, further comprising a steer-to-null phase wherein an angular measurement from said second slit sun sensor is used to bring the sun to a bore sight formed by said second slit sun sensor, the spacecraft is steered in a direction opposite to a previous pitch search direction, quaternions are reset to remember position when said first TOA occurs, and said sun hold phase is entered.

10. The method of claim 1 wherein said sun hold phase comprises rotating the spacecraft 90 degrees about a yaw axis and placing the spacecraft in x-spin.

11. A method for spacecraft sun acquisition comprising steps of:
performing an initialization phase wherein a spacecraft is placed in a known state suitable for sun acquisition;
performing a yaw search phase wherein said spacecraft is rotated about a yaw axis, said spacecraft is stopped, quaternions are reset to remember position, and said sun hold phase is entered when a second TOA occurs from a second slit sun sensor;
performing a pitch search phase wherein said spacecraft is rotated about a pitch axis, said spacecraft is stopped, quaternions are reset to remember position, and said yaw search phase is entered when a first TOA occurs from a first slit sun sensor; and
performing a sun hold phase wherein said spacecraft is oriented to the sun and placed in spin.

12. The method of claim 11 wherein said pitch search phase is initially performed before said yaw search phase is initially performed and wherein, in said pitch search phase, said spacecraft is rotated about a pitch axis and a keyhole slew is performed when said first TOA does not occur after a complete revolution.

13. The method of claim 11 wherein said yaw search phase is initially performed before said pitch search phase is initially performed and wherein, in said yaw search phase, said spacecraft is rotated about a yaw axis and said pitch search phase is entered when said second TOA does not occur from said second slit sun sensor after a complete revolution.

14. The method of claim 11 wherein said yaw search phase is initially performed before said pitch search phase is initially performed and wherein, in said pitch search phase, said yaw search phase is entered when said first TOA occurs from a first slit sun sensor and a desired final state is x-spin, and said sun hold phase is entered when said first TOA occurs from said first slit sun sensor and a desired final state is z-spin.

15. The method of claim 11 wherein said spin in said sun hold phase includes zero rate spin.

16. The method of claim 11, further comprising a step of performing a null rate phase wherein a body rate of said spacecraft is nulled and said pitch search phase is entered.

17. The method of claim 11, wherein said pitch search phase further comprises a keyhole slew phase wherein said keyhole slew phase is entered when said first TOA does not occur, said spacecraft is rotated 90 degrees about a yaw axis in said keyhole slew phase, and said pitch search phase is entered.

18. The method of claim 11, wherein said yaw search phase further comprises a steer-to-null phase wherein an angular measurement from said second slit sun sensor is used to bring the sun to a bore sight formed by said second slit sun sensor, said spacecraft is steered in a direction opposite to a previous pitch search direction, quaternions are reset to remember position when said first TOA occurs, and said sun hold phase is entered.

19. The method of claim 11 wherein said sun hold phase comprises rotating said spacecraft 90 degrees about a yaw axis and placing said spacecraft in x-spin.

20. A method of sun acquisition for a spacecraft having a time of arrival (TOA) sun sensor and an actuator for attitude and momentum adjustment, comprising:
a sun hold phase wherein the spacecraft is oriented to the sun and placed in spin;
a yaw search phase wherein the spacecraft is rotated about a yaw axis;
a pitch search phase wherein said pitch search phase is initially entered before said yaw search phase is initially entered;
a null rate phase wherein a motion of the spacecraft is stopped and said pitch search phase is entered;
an initialization phase wherein the spacecraft is placed in a known state suitable for sun acquisition and said null rate phase is entered, and wherein the algorithm begins in said initialization phase; and
wherein, in said pitch search phase, the spacecraft is rotated about a pitch axis, the spacecraft is stopped, quaternions are reset to remember position, and said yaw search phase is entered when said first TOA occurs from a first slit sun sensor, and the spacecraft is rotated about a pitch axis and a keyhole slew is performed when said first TOA does not occur from said first slit sun sensor after a complete revolution; and
wherein, in said yaw search phase, the spacecraft is rotated about a yaw axis, the spacecraft is stopped, quaternions are reset to remember position, and said sun hold phase is entered when a second TOA occurs from a second slit sun sensor.

21. The method of claim 20 wherein, in said null rate phase, a body rate of the spacecraft is nulled.

22. The method of claim 20 wherein said keyhole slew is performed by rotating the spacecraft 90 degrees about a yaw axis.

23. The method of claim 20, further comprising a steer-to-null phase wherein an angular measurement from said second slit sun sensor is used to bring the sun to a bore sight formed by said second slit sun sensor, the spacecraft is steered in a direction opposite to a previous pitch search direction, quaternions are reset to remember position when said first TOA occurs, and said sun hold phase is entered.

24. The method of claim 20, wherein thrusters are used as actuators to rotate the spacecraft.

25. The method of claim 20, wherein wheels are used as actuators to rotate the spacecraft.

26. The method of claim 20, wherein rotating the spacecraft is performed at a predetermined rate.

27. The method of claim 20, wherein rotating the spacecraft is performed at a rate computed based on the spacecraft momentum and wheel momentum capacity.

28. The method of claim 20, wherein said sun hold phase checks a received panel current, and enters said pitch search phase when said received panel current is low.

29. The method of claim 20, wherein said sun hold phase includes rotating along sun line.

30. A spacecraft having a body reference frame with three mutually perpendicular axes, comprising a spin axis, a pitch axis, and a yaw axis, said spacecraft comprising:
a first slit sun sensor that provides a first time of arrival (TOA) signal;
a second slit sun sensor that provides a second TOA signal;
a gyro used to propagate quaternions;

a spacecraft control processor (SCP) that receives said first TOA signal and said second TOA signal and controls movement of said spacecraft about said spin axis, said pitch axis, and said yaw axis wherein:
  said spacecraft performs a pitch search phase wherein the spacecraft is rotated about a pitch axis, the spacecraft is stopped, said quaternions are reset to remember position, and said spacecraft enters a yaw search phase when said first TOA signal is received from said first slit sun sensor,
  said spacecraft performs said yaw search phase wherein the spacecraft is rotated about a yaw axis, the spacecraft is stopped, said quaternions are reset to remember position, and said spacecraft enters a sun hold phase when said second TOA is received from said second slit sun sensor, and
  said spacecraft performs said sun hold phase wherein the spacecraft is oriented to the sun and placed in spin about said spin axis.

31. The spacecraft of claim 30 further comprising thrusters wherein said SCP controls said thrusters to rotate the spacecraft about said spin axis, said pitch axis, and said yaw axis.

32. The spacecraft of claim 30 further comprising wheels wherein said SCP controls said wheels to rotate the spacecraft about said spin axis.

33. The spacecraft of claim 30 wherein said first TOA signal is provided by an arm-trigger type hardware.

34. The spacecraft of claim 30 wherein said first TOA signal is a software TOA by zero-crossing detection of differential angular signal.

35. The spacecraft of claim 30 wherein said first TOA signal is a software TOA by peak detection of individual slit signal.

36. The spacecraft of claim 30 wherein said first TOA signal is a software TOA by maximum derivative detection of differential angular signal.

37. The spacecraft of claim 30 wherein said spacecraft initially performs said pitch search phase before initially performing said yaw search phase, and wherein, in said pitch search phase, the spacecraft is rotated about a pitch axis and a yaw search slew is performed when said first TOA signal is not received by said SCP after a complete revolution.

38. The spacecraft of claim 30 wherein said spacecraft initially performs said yaw search phase before initially performing said pitch search phase, and wherein, in said yaw search phase, the spacecraft is rotated about a yaw axis and said pitch search phase is entered when said second TOA signal is not received from said second slit sun sensor after a complete revolution.

39. The spacecraft of claim 30 wherein said spacecraft initially performs said yaw search phase before initially performing said pitch search phase, and wherein, in said pitch search phase, said yaw search phase is entered when said first TOA is received from said first slit sun sensor and a desired final state is spin about said spin axis, and said sun hold phase is entered when said first TOA is received from said first slit sun sensor and a desired final state is spin about said yaw axis.

40. The spacecraft of claim 30 wherein said gyro includes an inertial reference sensor and a sensor used to measure relative attitude.

* * * * *